United States Patent
Fry et al.

(10) Patent No.: US 6,636,904 B2
(45) Date of Patent: *Oct. 21, 2003

(54) DYNAMIC PCI DEVICE IDENTIFICATION REDIRECTION ON A CONFIGURATION SPACE ACCESS CONFLICT

(75) Inventors: Walter G. Fry, Houston, TX (US); Robert E. Krancher, Houston, TX (US); Richard S. Lin, Houston, TX (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,687

(22) Filed: Nov. 18, 1999

(65) Prior Publication Data

US 2003/0097509 A1 May 22, 2003

(51) Int. Cl.[7] .................................................. G06F 3/00
(52) U.S. Cl. .............................. 710/8; 710/9; 710/10; 710/38; 710/303; 710/311; 710/312; 710/313; 710/316
(58) Field of Search ........................... 710/8, 9, 10, 38, 710/303, 313, 316, 311, 312

(56) References Cited

U.S. PATENT DOCUMENTS

| | | | | |
|---|---|---|---|---|
| 5,157,665 A | * | 10/1992 | Fakhraie-Fard et al. | 370/241 |
| 5,610,829 A | * | 3/1997 | Trimberger | 716/16 |
| 5,799,036 A | * | 8/1998 | Staples | 375/222 |
| 6,018,781 A | * | 1/2000 | Goeppel | 710/115 |
| 6,094,700 A | * | 7/2000 | Deschepper et al. | 710/30 |
| 6,145,029 A | * | 11/2000 | Deschepper et al. | 710/303 |
| 6,161,161 A | * | 12/2000 | Botkin et al. | 710/313 |
| 6,173,358 B1 | * | 1/2001 | Combs | 711/100 |
| 6,285,603 B1 | * | 9/2001 | Ku et al. | 365/200 |
| 6,360,352 B2 | * | 3/2002 | Wallace | 716/11 |
| 6,519,669 B1 | * | 2/2003 | Yanagisawa | 710/304 |

OTHER PUBLICATIONS

Intel® 440BX AGPset: 82443BX Host Bridge/Controller, Datasheet, Apr. 1998.
PCI Local Bus Specification, Revision 2.2, Dec. 18, 1998.

* cited by examiner

Primary Examiner—Jeffrey Gaffin
Assistant Examiner—Niketa I Patel

(57) ABSTRACT

A computer system reroutes a configuration cycle intended for an unused system bus address line to the IDSEL, or equivalent, configuration chip select input pin of a device which uses the same system bus address line as another device on the system bus. The computer system has a PCI bus to which a programmable logic device and an electronically-controlled switch are connected. The programmable logic device detects PCI bus configuration cycles associated with a PCI bus AD line that is otherwise unused as a chip select during configuration cycles. When the logic device detects a configuration cycle associated with the unused AD line, the logic device asserts a control signal to the electronically-controlled switch. The switch then connects the previously unused AD line to the AD line that is connected to the IDSEL input pin of the PCI device that experiences the conflict. The PCI device then effectively responds to the configuration read or write cycle as if its IDSEL input pin was hardwired to the switched AD line.

11 Claims, 3 Drawing Sheets

DYNAMIC PCI DEVICE IDENTIFICATION REDIRECTION ON A CONFIGURATION SPACE ACCESS CONFLICT

CROSS-REFERENCE TO RELATED APPLICATIONS

Not applicable.

STATEMENT REGARDING FEDERALLY SPONSORED RESEARCH OR DEVELOPMENT

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention generally relates to computer systems in which configuration cycles can be performed on a peripheral bus. More specifically, the present invention relates to a Peripheral Component Interconnect ("PCI") bus on which two PCI-compatible devices share the same configuration select signal thereby causing a conflict when the common select signal is asserted to run a configuration cycle. The invention avoids the conflict by using an alternate signal as the select signal for one of the PCI devices.

2. Background of the Invention

Most, if not all, computer systems include one or more microprocessors (e.g., Intel Pentium III, AMD K6), system memory (often referred to as "RAM" for Random Access Memory), disk drives, a keyboard, and various other components. The system memory and microprocessor (also called the Central Processing Unit or "CPU") typically couple together via a "host bridge" logic device. The host bridge also includes an interface to a system bus such as the well-known Peripheral Component Interconnect ("PCI") bus. The host bridge generally permits the CPU, system memory and various devices connected to the PCI bus to communicate with one another in a coordinated manner.

For example, the CPU, PCI-compatible devices, and other devices in the computer system may desire to write data to or read data from system memory. Because system memory generally can only respond to one read or write request at a time, the host bridge usually includes a memory controller and arbiter to determine which memory request is allowed to execute—the other pending requests may be stored in a temporary buffer waiting their turn to be executed by the memory controller.

The PCI bus coupled to the host bridge generally is a 32-bit or 64-bit bus with multiplexed address and data lines, called "AD" lines in the PCI Local Bus Specification, Revision 2.2, dated Dec. 18, 1998, incorporated herein by reference in its entirety. This means that addresses and data are placed on the same set of signal lines, but at different times. In accordance with the PCI Local Bus Specification, the address is placed on the AD lines first and any data associated with a write cycle, for example, is placed on the AD lines afterwards.

Besides read and write cycles, configuration cycles can be performed on the PCI bus. Configuration cycles are often performed during the Power-On Self-Test ("POST") process. During POST, one action performed by the CPU is to attempt to determine how many PCI devices are present in the computer system and, for those PCI devices that are present and available, to read the configuration information stored in the devices. In accordance with the PCI Local Bus Specification, all PCI-compatible devices (referred to throughout this disclosure simply as "PCI devices") are required to have 256 bytes of configuration registers. In a configuration read cycle, the CPU, although in general it could be a device other than the CPU, can read a PCI device's configuration registers. In a configuration write cycle, the CPU can reconfigure a PCI device by writing new values to that device's configuration registers.

A PCI device must include an Initialization Device Select ("IDSEL") input signal. The IDSEL input is used as a chip select during configuration read and write transactions. Thus, when the CPU reads configuration information from a PCI device or writes configuration to a PCI device, the IDSEL input of the target PCI device must be asserted. Each PCI device provides an IDSEL input signal that is independently asserted by, for example, a host bridge device. Accordingly, the host bridge provides separate signals to the IDSEL input pins of the various PCI devices.

The PCI Local Bus Specification does not dictate how a PCI device's IDSEL pin is to be driven; that decision is left to the discretion of the host bridge designer. One approach has been to connect a unique address AD line to each PCI device's IDSEL pin. For example, the upper 21 AD lines of the AD portion of the PCI bus (i.e., AD[31::11]), are available for connection to IDSEL pins. One PCI device may have its IDSEL pin connected to AD14, while a separate PCI device may have its IDSEL pin connected to AD15. When the CPU, via the host bridge, wishes to perform a PCI configuration read or write cycle to a particular PCI device, the host bridge asserts the AD line connected to the target PCI device to signal to that PCI device that a configuration cycle is to be run.

During POST as the CPU determines the existence of the PCI devices connected to the PCI bus, each AD line potentially used as an input to a device's IDSEL pin is independently "strobed." That is, the CPU directs the host bridge to assert each AD[31::11] line one at a time. If a particular AD line is not connected to a PCI device's IDSEL pin, the CPU will not receive a response and determines that there is no device present on the PCI bus connected to that particular AD line. If the CPU receives a response after a particular AD line is asserted, then the CPU determines that there is a PCI device whose IDSEL input pin is tied to that particular AD line. The CPU can request that PCI device to provide the contents of its configuration registers to the CPU. The CPU also can write new configuration information to that PCI device to configure or reconfigure the device.

The devices connected to the PCI bus are each assigned an identifying number such as "Device 0," "Device 1," "Device 2," and so on. A suitable host bridge is the 82443BX Host Bridge/Controller provided by Intel®. The 82443BX includes a number of registers including a Configuration Address Register ("CONFADD"). The CONFADD register can be read or written by the CPU in the computer system. The CONFADD register includes a Device Number field associated with bits 15:11. The CPU can run a configuration cycle to any desire device number by writing the device number value to this field. The 82443BX host bridge interprets this field and asserts one bit among AD[31::11] to initiate the configuration cycle on the PCI bus. In accordance with the 82443BX host bridge specification, if the host bridge decodes a device number as 2, the host bridge responds by asserting AD13. Similarly, a device number of 3 will cause the host bridge to assert AD14, and so on.

Device numbers 0 and 1 are contained within the 82443BX host bridge chip itself and thus are pre-assigned to the 82443BX host bridge. Thus, other devices on the PCI must not be assigned Device 0 or Device 1. Device 0 is assigned to the CPU Host-to-PCI Bridge interface within the 82443BX and Device 1 is assigned to the Host-to-AGP Interface ("AGP" stands for Advanced Graphics Port and is a special function PCI bus designed for graphics-related bus transfers). Device 0 and Device 1 sometimes are referred to as "virtual" devices because they are not physically separate devices; they are part of the host bridge device itself. The 82443BX host bridge internally references the AD11 and AD12 pins as corresponding IDSELs for the Devices 0 and 1, respectively during PCI configuration cycles. For this reason, the 82443BX host bridge specification states that the AD11 and AD12 lines must not be connected to any other PCI bus device as IDSEL inputs. Otherwise, a conflict would occur if a configuration cycle was attempted to a PCI device whose IDSEL pin was tied to AD11 or AD12.

A typical computer system includes components designed and manufactured by a variety of manufacturers. For example, Texas Instruments provides a cardbus controller (PCI 1131) module that is designed to be used in an expansion base for interconnection to laptop computers. The PCI 1131 cardbus controller is a PCI bus-compliant device that is "pre-wired" to have AD11 connected to its IDSEL input pin. As explained above, this will cause a conflict in a computer system which also uses the Intel® 82443BX host bridge. The same sort of PCI bus configuration cycle conflict also may occur with other models of host bridge chips and PCI devices.

One solution to the problem might be for Intel or Texas Instruments to change the design of its part to avoid this conflict. This approach, however, might result in creating a similar conflict with respect to other PCI devices that might be included in the computer system. Thus, another solution is needed that can avoid the PCI configuration cycle conflict described above. Despite the advantages such a solution would provide, no system is known to date that solves the conflict problem.

BRIEF SUMMARY OF THE INVENTION

The problems noted above are solved in large part by a computer system that reroutes a configuration cycle intended for an unused system bus address line to the IDSEL, or equivalent, configuration chip select input pin of a device which uses the same system bus address line as another device on the system bus. In accordance with a preferred embodiment of the invention, the computer system has a system bus, preferably a PCI bus, to which a logic device and an electronically-controlled switch are connected. The logic device, which preferably is programmable, detects PCI bus configuration cycles associated with a PCI bus AD line that is otherwise unused as a chip select during configuration cycles. In accordance with one embodiment, the unused AD line is the AD16 line.

When the logic device detects a configuration cycle associated with the unused AD line (e.g., the AD16 line), the logic device claims the cycle and issues a retry. The logic device then asserts a control signal to the electronically-controlled switch. The master (host bridge) then retries the configuration cycle. The switch then connects the previously unused AD line to the AD line that is connected to the IDSEL input pin of the PCI device that experiences the conflict, such as that described above. The PCI device then effectively responds to the configuration read or write cycle as if its IDSEL input pin was hardwired to the switched AD line.

Thus, the computer system avoids the types of conflicts described above by rerouting a configuration cycle intended for an unused PCI bus AD line to the AD line connected to the IDSEL pin of the device that would otherwise have suffered the conflict.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
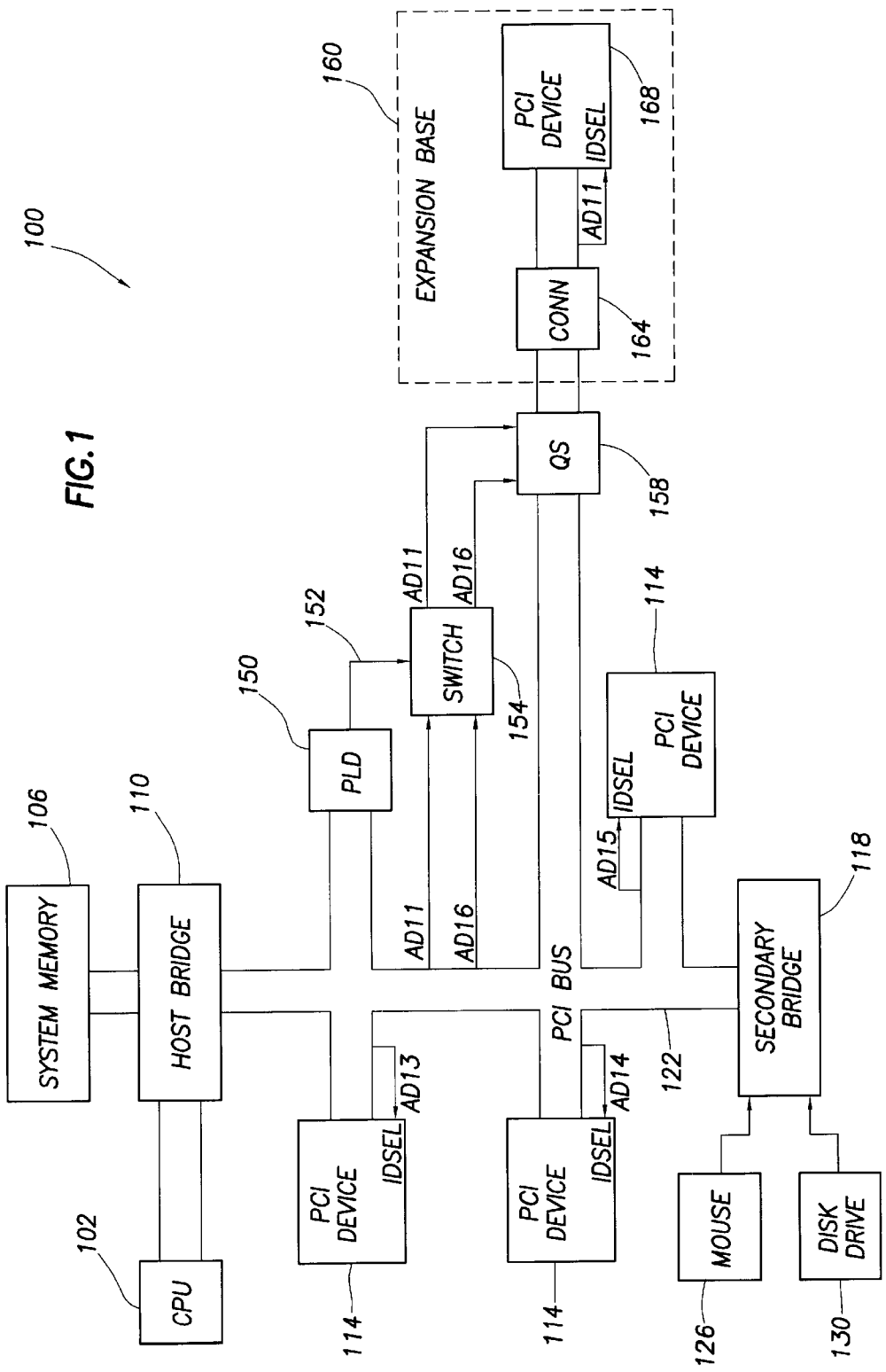
FIG. 1 shows a computer in accordance with the preferred embodiment and including a programmable logic device and switch that detects a PCI configuration cycle conflict and takes action to avoid the conflict.

Referring now to FIG. 1, a computer system 100 constructed in accordance with a preferred embodiment of the invention generally comprises a central processing unit ("CPU") 102 coupled to system memory 106 through a host bridge device 110. It should be understood, however, that other embodiments of the invention may include more than one CPU (e.g., 2, 3, 4). The CPU may be any suitable microprocessor such as the Pentium II or Pentium III processors provided by Intel®. The system memory 106 preferably comprises one or more memory devices such as any suitable type of random access memory ("RAM"). System memory may comprise, for example, synchronous dynamic random access memory ("SDRAM").

The host bridge 110 permits the CPU 102 to read data from or write data to system memory 106. The host bridge 110 also has an interface to a system or peripheral bus 122. In the preferred embodiment shown in FIG. 1, host bridge 110 interfaces to a Peripheral Component Interconnect ("PCI") bus. Various PCI-compliant devices 114 connect to the PCI bus 122. Through host bridge 110, the CPU 102 can communicate with PCI devices 114, and similarly, PC devices 114 can read data from and write data to system memory 106 via the host bridge 110. The host bridge preferably contains memory controller and arbiter logic (not specifically shown) to provide controlled and efficient access to system memory 106 by the various devices in computer system 100 such as CPU 102 and PCI devices 114. A suitable host bridge is the 82443 BX Host Bridge/Controller provided by Intel® and described in the Intel® 440BX AGPset: 82443BX Host Bridge/Controller datasheet dated April, 1998 which is incorporated herein by reference in its entirety.

Referring still to FIG. 1, computer system 100 preferably also includes a secondary bridge device 118 which couples to a variety of input/output devices such as a mouse 126 and disk drive 130. One of ordinary skill in the art will recognize that a disk drive controller (not shown) may also be included to provide effective data transfers to and from disk drive 130. The secondary bridge device may also include interfaces to other types of buses (not shown) such as the Industry Standard Architecture ("ISA") bus.

As indicated in FIG. 1, computer system 100 is a laptop computer that can be plugged into an expansion base 160. Expansion base 160 includes a variety of components such as a connector 164 and a PCI-compliant device 168, which may be, for example, a cardbus controller (e.g., PCI 1131 manufactured by Texas Instruments). The PCI bus 122 is routed to the expansion base through "quick switch" 158 which ensures that no electrical signals are provided to connector 164 until after the laptop is inserted into the expansion base.

Computer system 100 preferably also includes a Programmable Logic Device ("PLD") 150 and a switch unit 154. The PLD 150, which may be a 7128 ATC manufactured by Altera, couples to PCI bus 122 and provides a control signal 152 to the switch unit 154 to control the state of the switch unit 154. As is commonly known, a PCI bus includes 32 address and data lines, AD[31::0]. PCI bus address and data lines AD11 and AD 16 preferably are switched by the switch unit 154 under control of the PLD 150 via control signal 152. How and why AD11 and AD16 are switched will be explained below.

One of ordinary skill in the art should recognize that there may be many other components of computer system 100 not shown in FIG. 1; the components more relevant to the preferred embodiment of the invention are shown.

Referring still to FIG. 1, PCI devices 114 have an input pin labeled IDSEL that, as described above, functions as a chip select for the device during a PCI configuration read or write cycle. Each IDSEL input pin is tied to a PCI bus address and data line in the range of AD[31::11]. The IDSEL inputs of the three PCI devices are shown in FIG. 1 to be tied to AD13, AD14, and AD15. Preferably, each IDSEL input is tied to a different AD line so that no two PCI devices have their IDSEL input pins tied to the same AD line. However, as noted above, this may not always be the case; two or more PCI devices may actually have their IDSEL input pins tied to the same AD line thereby causing a conflict when configuration cycles need to be run to each such device.

The principles of the preferred embodiment of the present invention are illustrated in the following discussion to solve the conflict when the host bridge 110 has a "PCI device"(a "virtual" device because the PCI device is part of the host bridge chip itself) that is assigned to the same AD line as PCI device 168 in expansion base 160. The PCI device 168 in expansion base 160 may be, as noted above, a cardbus controller that has its IDSEL input pin tied to AD11 as shown. The host bridge 110, which may be the Intel® 82443 BX Host Bridge/Controller, has its Device 0 assigned to AD11. Thus, CPU 102 will not be able to run a PCI configuration read or write cycle to PCI device 168 because the host bridge 110 will intercept or otherwise accept the configuration request and not permit the cycle to be run to PCI device 168. The preferred embodiment of the invention described herein solves this problem. The preferred embodiment can readily be adapted to avoid conflicts between any pair, or more, of devices on a bus.

The PCI Local Bus Specification limits the number of PCI devices that can be connected to a PCI bus to 17. That is, it is only permitted to have 17 PCI devices connected to a PCI bus. The number of AD lines, however, that are available for use as inputs to the PCI devices' IDSEL pins is 21 (AD [31::11]). Thus, there will always be at least one, and generally 4, AD lines that are unused to connect to IDSEL pins. Of course, it should be recognized that all of the AD lines generally are used to represent addresses and data during read and write cycles and the data portion of configuration cycles. PLD 150 generally directs switch unit 154 to switch an unused AD line (e.g., AD16) to the common AD line, AD11, when a configuration cycle is run to the unused AD line (AD16).

Figure 3:
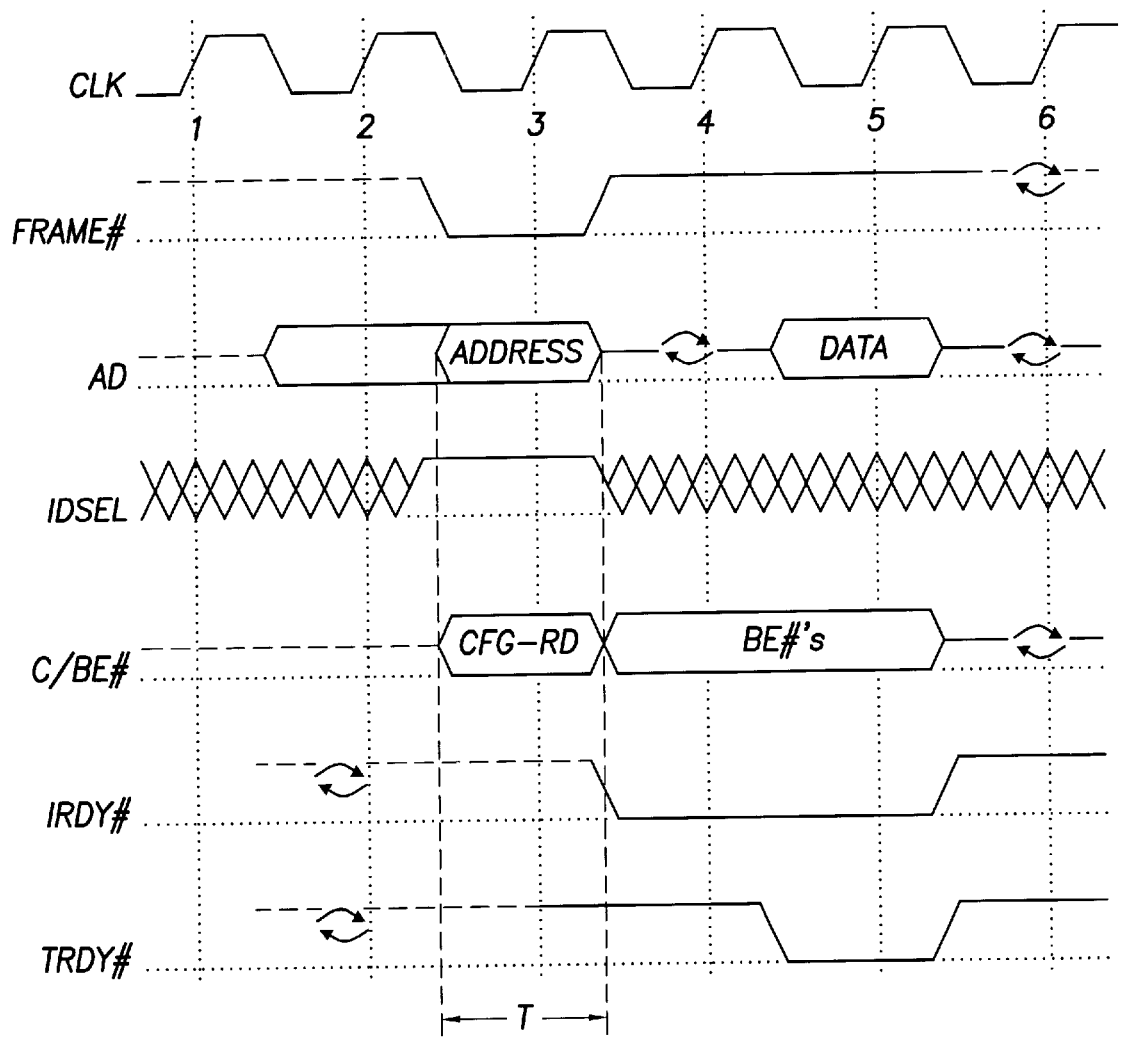
FIG. 3 shows a timing diagram for a typical PCI configuration read cycle.

More specifically, during POST as the CPU runs PCI bus configuration read cycles to determine what PCI devices are present in computer system 100, the host bridge 110 internal virtual PCI devices (Device 0 and Device 1 described above) and the three PCI devices 114 illustrated in FIG. 1 will respond to configuration read cycles directed to PCI address/data lines AD11, AD12, AD13, AD14, and AD15. Assuming that none of the rest of the AD lines (i.e., AD[31:16]) are connected to IDSEL inputs of other PCI devices, the PLD 150 preferably is programmed to switch one of those unused AD lines (e.g., AD16) to be the IDSEL input to PCI device 168. The PLD 150 uses AD16 as the IDSEL input to PCI device 168 by directing switch 154 to reroute AD16 onto the AD11 signal provided to PCI device 168 which, as shown, is tied to the IDSEL input pin of PCI device 168. With AD16 rerouted to AD11 (and thus the PCI device 168 IDSEL pin), PCI device 168 responds to a PCI configuration cycle run to AD16. Referring briefly to FIG. 3, a timing diagram for a typical PCI configuration read cycle includes an "address" denoted as T followed by a "data" phase. During the address phase T, AD[31:11] are used as chip select signals to select a particular PCI device to respond to the configuration cycle. Preferably, for AD16 associated configuration cycles, during T PLD 150 asserts the control signal 152 to cause the switch unit 154 to reroute AD16 onto the AD11 line provided to PCI device 168.

Once the address phase T is completed or at another suitable moment, PLD 150 deasserts control signal 152 to cause switch unit 154 to switch back the AD16 and AD11 lines to their original state so that all of the AD lines, AD[31::0] are available to accurately transfer data. As such, the CPU 102, or other device initiating the configuration cycles, and PCI device 168 are "fooled" into thinking that PCI device 168 has its IDSEL input pin permanently tied to AD16. All configuration read and write cycles to PCI device 168 following the post process will be initiated to using AD16 as the chip select during address phase T. Accordingly, the PLD 150 and switch unit 154 function effectively to reroute an unused AD line to PCI device 168 to avoid a configuration cycle conflict that would otherwise have occurred.

Figure 2A:
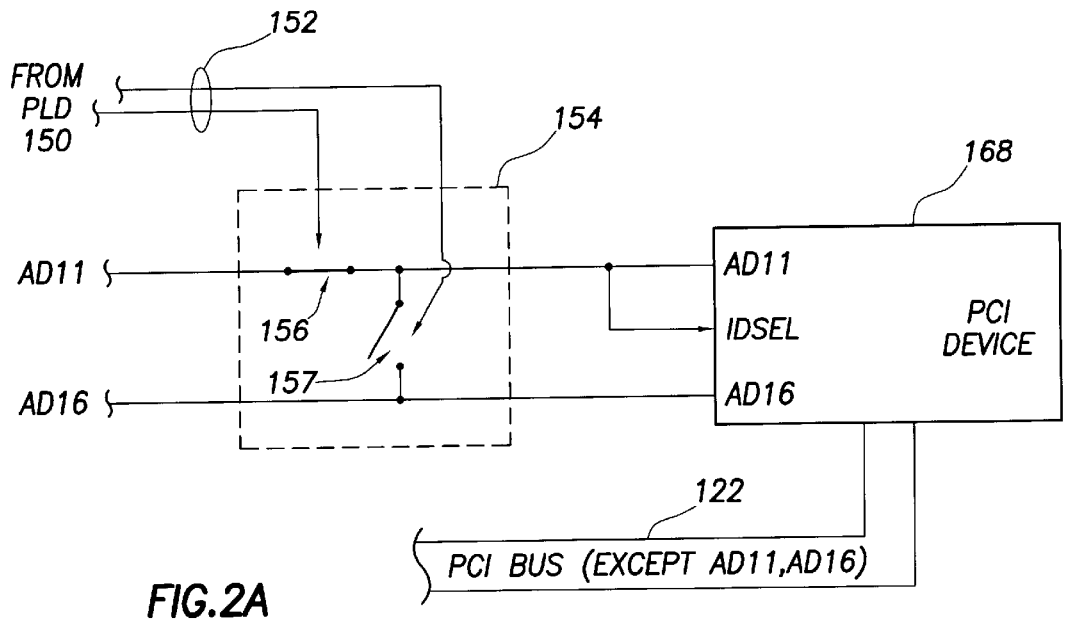
FIGS. 2A–2B show further detail of the switch to solve the conflict problem noted above.
Figure 2B:
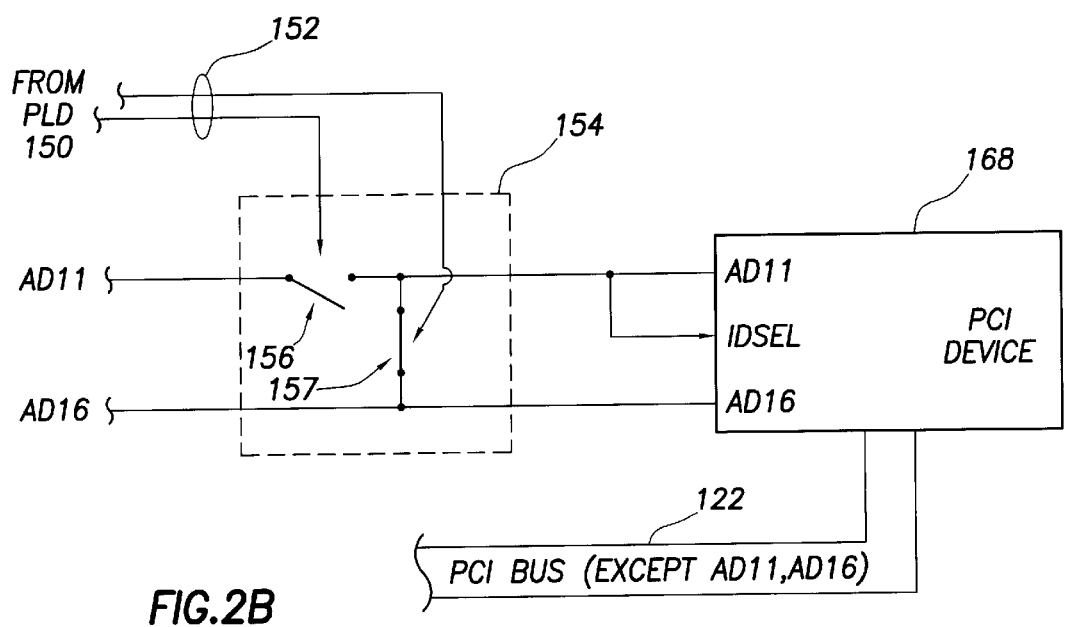

Referring now to FIGS. 2A and 2B, the switch unit 154 preferably comprises two electronically-controlled, single pole, single throw switches 156 and 157. Switches 156 and 157 preferably are controlled to be in different states (i. e., one open and the other closed and vice versa) by PLD 150 via control signal 152. Accordingly, the control signal 152 from PLD 150 preferably includes two separate signals, each signal controlling one of the switches 156 and 157. FIG. 2A shows the normal state of the switch unit 154. As shown switch 156 is closed and switch 157 is open. As such, AD11 and AD16 from PCI bus 122 are passed through to the AD11 and AD16 pins, respectively, of PCI device 168. In this state, all AD lines, including AD11 and AD16, are available to represent 32-bit addresses and data.

FIG. 2B, however, represents the condition in which the CPU 102 is attempting to run a PCI configuration cycle to the PCI device whose IDSEL input, the CPU believes, is tied to AD16 (PCI device 168). The PLD 150 detects this event, claims the cycle and issues a retry to host bridge 110. The PLD 150 then changes the state of switches 156, 157 from that shown in FIG. 2A to the states shown in FIG. 2B. The host bridge 110 issues a retry to CPU 102. As shown in FIG. 2B, switch 156 is open and switch 157 is closed. With switch 156 open, AD11 from PCI bus 122 is disconnected from PCI device 168. With switch 157 closed, AD16 is connected to the AD11 pin on PCI device 168, and also to the IDSEL pin of PCI device 168. Accordingly, PCI device 168 is able to respond to the PCI configuration cycle run to AD16. The PLD 150 changes the state of switches 156, 157 back to that shown in FIG. 2A to permit configuration data to be transmitted over PCI bus 122.

During POST, when the CPU 102 runs a PCI configuration cycle associated with AD16, PCI device 168 responds with the data stored in its configuration registers (not shown). The CPU 102 then believes that a PCI device does exist in computer system 100 that has its IDSEL pin tied to AD16, although the device (PCI device 168) is actually tied to AD11 as shown in FIG. 1. From then on, the CPU 102 can run configuration read and write cycles to PCI device 168 by performing a PCI configuration cycle for AD16. PLD 150 detects such cycles and switches AD11 and AD16 to force PCI device 168 to respond to configuration cycles associated with AD16.

PLD 150 preferably is programmed to detect a configuration cycle associated with AD16 by examining the C/BE [3::0] signals (FIG. 3). A PCI configuration cycle is requested by the CPU by setting C/BE# to binary 1010 for a configuration read or binary 1011 for a configuration write. Once a configuration cycle is detected, the PLD 150 samples the AD lines, and if AD16 is asserted, determines that a configuration read or write is being run for the PCI device selected by AD16. The PLD 150 then asserts control signal 152 as described above.

The PLD 150 can be programmed according to the following exemplary code in accordance with well-known techniques, although numerous other code embodiments are possible as well:

```
Copyright Compaq Computer Corporation 1999
assign QSwitchDefEn_ = QSwitchPMCEn_|| QSwitchDefOff;
always @(posedge gclk or posedge ExpClkEn_)
begin
if(ExpClkEn_)
begin
ConfigState <= ConfigInit;
QSwitchMuxEn_ <= 1;
QSwitchDefOff <= 0;
PCIoe <= 0;
Stopout_ <= 1;
DevSelout_ <= 0;
end
else
begin
case (ConfigState)
ConfigInit:
begin
if(sFrame_&& !Frame_&& (CBE_[3:1] == 3'h5) && ADin[16] &&
!ADin[1] && !ADin[0])
begin
PCIoe <= 1;
DevSelout_ <= 0;
ConfigState <= ConfigRetry;
end
end
ConfigRetry:
begin
Stopout_ <= 0;
ConfigState <= ConfigRetry2;
end
ConfigRetry2:
begin
if(!IRDY_)
begin
Stopout_ <= 1;
DevSelout_ <= 1;
ConfigState <= ConfigRetry3;
end
end
ConfigRetry3:
begin
if(sFrame_&& !Frame_&& (CBE_[3:1] == 3'h5) && ADin[16] &&
!ADin[1] && !ADin[0])
begin
QSwitchMuxEn_ <= 1;
QSwitchDefOff <= 0;
ConfigState <= ConfigInit;
end
else
if(!Gnt0_|| !Gnt1_|| !Gnt2_|| !Gnt4_|| !sBXPhIda_)
begin
QSwitchMuxEn_ <= 1;
QSwitchDefOff <= 0;
end
else
if(PCI_Idle)
begin
QSwitchMuxEn_ <= 0;
QSwitchDefOff <= 1;
end
PCIoe <= 0;
end
endcase
end
end
```

The above discussion is meant to be illustrative of the principles and various embodiments of the present invention. Numerous variations and modifications will become apparent to those skilled in the art once the above disclosure is fully appreciated. For example, PLD 150 can be implemented using discrete, non-programmable components. Furthermore, the logic implemented by PLD 150 can be implemented in the host bridge 110 or secondary bridge 118. It is intended that the following claims be interpreted to embrace all such variations and modifications.

What is claimed is:

1. A computer system, comprising:
   a processor;
   a system memory coupled to said processor;
   a bridge logic device coupled to said processor and said system memory and having a peripheral bus interface;
   a peripheral bus comprising a plurality of address lines and coupled to the peripheral bus interface of said bridge logic device, said peripheral bus capable of coupling together various peripheral devices;
   an input/output device coupled to said bridge logic device;

a logic device coupled to said peripheral bus that swaps two address lines when a peripheral bus cycle is run to a particular asserted address line; and wherein said logic device swaps the two address lines only during a portion of the peripheral bus cycle and swaps the address lines back to their original state for the rest of the bus cycle.

2. A programmable logic device coupled to a PCI bus comprising a plurality of AD lines, and said programmable logic device having logic that detects a PCI bus configuration read or write cycle to AD 16 and, upon detecting a configuration read or write cycle to AD16, the programmable logic device asserts a control signal to an electronically-controlled switch to connect the PCI bus AD16 line to another address line.

3. A programmable logic device coupled to a PCI bus comprising a plurality of AD lines, said programmable logic device having logic that detects configuration read or write cycle to a particular PCI bus AD line and, upon detecting a configuration read or write cycle to that particular AD line, the programmable logic device asserts a control signal to an electronically-controlled switch to connect the particular PCI bus AD line to another address line, and wherein said programmable logic device asserts the control signal during a portion of said configuration cycle and deasserts the control signal during the rest of the configuration cycle.

4. A method of avoiding a conflict on a system bus having a plurality of address lines during a configuration cycle, comprising:

(a) detecting a configuration cycle associated with a particular system bus address line;

(b) changing the state of a switch so that one of said address lines is connected to another of said address lines; and (c) changing the state of the switch back to its state before (b) was performed.

5. The method of claim 4 wherein the system bus comprises a PCI bus and (a) comprises detecting a PCI bus configuration cycle associated one of said PCI bus address lines.

6. The method of claim 5 wherein (b) includes changing the state of the switch during only a portion of the PCI bus configuration cycle.

7. The method of claim 6 further including issuing a retry after detecting a configuration cycle associated with the particular system bus address line and before changing the state of the switch in (b).

8. The method of claim 4 wherein (a) includes detecting a configuration cycle associated with a system bus address line that conflicts with a configuration cycle intended for a device connected to said system bus.

9. The method of claim 4 in which (b) includes connecting an address line that is not hardwired as a chip select signal to an address line that is hardwired as a chip select signal.

10. The method of claim 4 wherein (b) occurs only during an address phase of the configuration cycle.

11. The method of claim 10 wherein the system bus is a PCI bus having address lines AD[31::0] and (b) includes connecting AD16 to AD11.

* * * * *